United States Patent
Takahashi et al.

(10) Patent No.: US 12,350,738 B2
(45) Date of Patent: Jul. 8, 2025

(54) METHOD FOR MANUFACTURING COATED METAL POWDER

(71) Applicant: SEIKO EPSON CORPORATION, Tokyo (JP)

(72) Inventors: Momo Takahashi, Chino (JP); Takuya Miyakawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 207 days.

(21) Appl. No.: 17/807,814

(22) Filed: Jun. 20, 2022

(65) Prior Publication Data

US 2022/0402026 A1 Dec. 22, 2022

(30) Foreign Application Priority Data

Jun. 21, 2021 (JP) ................. 2021-102306

(51) Int. Cl.
*C23C 18/12* (2006.01)
*B22F 1/16* (2022.01)

(52) U.S. Cl.
CPC .............. *B22F 1/16* (2022.01); *C23C 18/122* (2013.01); *C23C 18/1241* (2013.01); *C23C 18/1254* (2013.01); *C23C 18/127* (2013.01); *B22F 2301/35* (2013.01); *B22F 2302/256* (2013.01)

(58) Field of Classification Search
CPC .............. C23C 18/122; C23C 18/1241; C23C 18/1254; C23C 18/127; C23C 18/1208; C23C 18/1291; C23C 18/1295
See application file for complete search history.

(56) References Cited

U.S. PATENT DOCUMENTS

| 4,375,373 | A | 3/1983 | Abe et al. |
| 6,387,532 | B1 | 5/2002 | Atarashi et al. |
| 2008/0044679 | A1 | 2/2008 | Maeda et al. |
| 2008/0299400 | A1* | 12/2008 | Furuya .................... C08L 83/04 524/588 |
| 2010/0028195 | A1 | 2/2010 | Maeda et al. |

FOREIGN PATENT DOCUMENTS

| JP | S5590560 | A | | 7/1980 | |
| JP | S58161708 | A | | 9/1983 | |
| JP | H06271310 | A | * | 9/1994 | ............. C23C 18/00 |
| JP | H11131102 | A | | 5/1999 | |
| JP | 2007088156 | A | | 4/2007 | |
| JP | 2009231481 | A | * | 10/2009 | |

OTHER PUBLICATIONS

JP-2009231481-A English translation. (Year: 2009).*
JP-H06271310-A English translation. (Year: 1994).*
Office Action for JP Patent Application No. 2021102306, issued on Mar. 4, 2025, 6 pages.

* cited by examiner

*Primary Examiner* — Hai Y Zhang
(74) *Attorney, Agent, or Firm* — CHIP LAW GROUP (57) ABSTRACT

A method for manufacturing a coated metal powder includes: preparing a silanol solution in which a silicon-containing substance is dissolved in an alkaline aqueous solution; charging a metal powder into the silanol solution to obtain a dispersion; and forming a coating containing a silicon oxide on a particle surface of the metal powder by adding an acidic aqueous solution to the dispersion.

9 Claims, 5 Drawing Sheets

METHOD FOR MANUFACTURING COATED METAL POWDER

The present application is based on, and claims priority from JP Application Serial Number 2021-102306, filed Jun. 21, 2021, the disclosure of which is hereby incorporated by reference herein in its entirety.

BACKGROUND

1. Technical Field

The present disclosure relates to a method for manufacturing a coated metal powder.

2. Related Art

JP-A-2009-231481 discloses a method for forming a silica film on a surface of a soft magnetic powder by a hydrolyzed solution containing tetraethoxysilane, an organic solvent, an alkali, and water. A soft magnetic powder for a dust core having high electric resistance can be obtained by forming the silica film.

Further, since the soft magnetic powder for a dust core having such a silica film can be subjected to a heat treatment at a high temperature of 800° C. or higher, a crystal grain size can be increased or a processing strain can be removed, making it possible to reduce a hysteresis loss of the dust core.

In the method described in JP-A-2009-231481, the organic solvent is used together with tetraethoxysilane to prepare the hydrolyzed solution. Therefore, an increase in cost due to the use of the organic solvent causes an increase in manufacturing cost of the soft magnetic powder for a dust core.

SUMMARY

A method for manufacturing a coated metal powder according to an application example of the present disclosure includes: preparing a silanol solution in which a silicon-containing substance is dissolved in an alkaline aqueous solution; charging a metal powder into the silanol solution to obtain a dispersion; and forming a coating containing a silicon oxide on a particle surface of the metal powder by adding an acidic aqueous solution to the dispersion.

DESCRIPTION OF EXEMPLARY EMBODIMENTS

Hereinafter, a preferred embodiment of a method for manufacturing a coated metal powder according to an aspect of the present disclosure will be described in detail with reference to the accompanying drawings.

1. Coated Metal Powder

Figure 1:
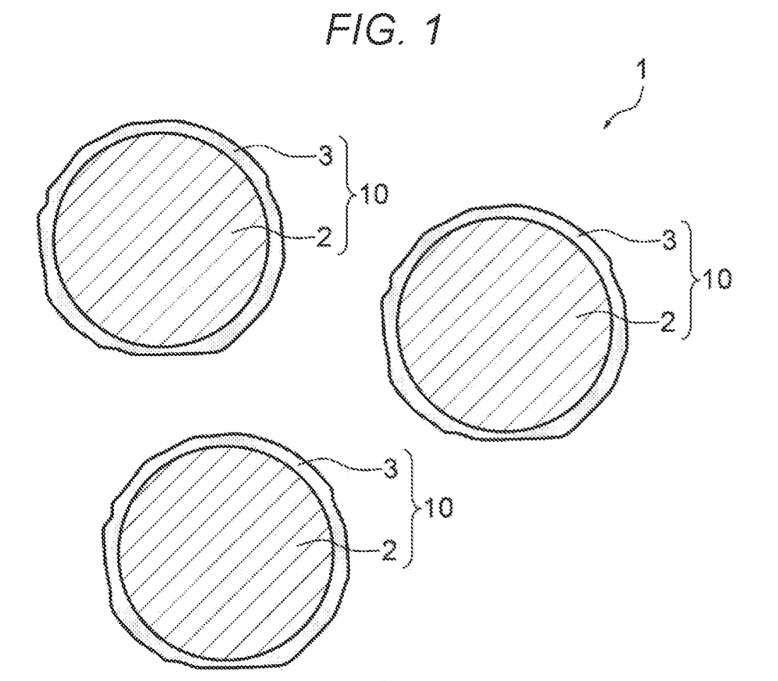
FIG. 1 is a cross-sectional view showing an example of a coated metal powder.

First, the coated metal powder will be described. FIG. 1 is a cross-sectional view showing an example of the coated metal powder.

A coated metal powder 1 shown in FIG. 1 is an aggregate of a plurality of particles. Hereinafter, each of the particles contained in the coated metal powder 1 is referred to as a coated metal particle 10. The coated metal particle 10 shown in FIG. 1 includes a core particle 2 and a coating 3 provided on a surface of the core particle 2.

1.1. Core Particle

A constituent material of the core particle 2 is not particularly limited as long as the constituent material is a metal material and may be any metal material, and an example thereof is a soft magnetic material. Since the coated metal particle 10 including the core particle 2 made of a soft magnetic material includes the coating 3 provided on the surface of the core particle 2, an insulating property between the particles can be easily improved. Therefore, the coated metal powder 1 is preferably used, for example, for a dust core having a small core loss (iron loss).

The soft magnetic material is not particularly limited as long as the soft magnetic material contains Fe, Ni, or Co as a main component, and examples of the soft magnetic material include pure iron, various Fe-based alloys such as a Fe—Si-based alloy such as silicon steel, a Fe—Ni-based alloy such as permalloy, a Fe—Co-based alloy such as permendur, a Fe—Si—Al-based alloy such as sendust, a Fe—Cr—Si-based alloy, and a Fe—Cr—Al-based alloy, various Ni-based alloys, and various Co-based alloys. Among these, various Fe-based alloys are preferably used from the viewpoint of magnetic properties such as magnetic permeability and magnetic flux density, cost, and the like.

A crystal structure of the soft magnetic material is not particularly limited, and may be crystalline, amorphous, or microcrystalline (nanocrystalline).

The "microcrystalline" refers to a crystalline structure having a particle size of 1.0 nm or more and 30.0 nm or less. Since the crystal structure of the soft magnetic material contains such a microcrystalline component, a soft magnetism of the soft magnetic material can be further improved. That is, a soft magnetic material having both a low coercive force and a high magnetic permeability can be obtained.

Examples of a soft magnetic material containing an amorphous component and a soft magnetic material containing a microcrystalline component include Fe-based alloys such as Fe—Si—B-based alloys, Fe—Si—B—C-based alloys, Fe—Si—B—Cr—C-based alloys, Fe—Si—Cr-based alloys, Fe—B-based alloys, Fe—P—C-based alloys, Fe—Co—Si—B-based alloys, Fe—Si—B—Nb-based alloys, Fe—Si—B—Nb—Cu-based alloys, and Fe—Zr—B-based alloys, Ni-based alloys such as Ni—Si—B-based alloys and Ni—P—B-based alloys, and Co-based alloys such as Co—Si—B-based alloys.

An oxide film may be present on the surface of the core particle 2. The oxide film refers to a coating made of an oxide of elements constituting the core particle 2.

1.2. Coating

The coating 3 is provided on the surface of the core particle 2. The coating 3 is preferably provided on the entire surface of the core particle 2, and may be provided only on a part thereof.

The coating 3 contains a silicon oxide. The silicon oxide is an oxide of silicon, and is a general term for, for example, $SiO_2$, $Si_2O_3$, SiO and $Si_2O$. The coating 3 is preferably made of the silicon oxide as a main material. The main material means that a volume ratio is 50% or more. Further, a content of the silicon oxide in the coating 3 is preferably 70% by volume or more, more preferably 90% by volume or more.

Such a volume ratio can be measured as an area ratio of the silicon oxide, for example, when area analysis, that is, a two-dimensional composition analysis is performed on a cross section of the coating 3.

Since the coating 3 contains the silicon oxide, the coating 3 imparts properties such as an insulating property, heat resistance, and corrosion resistance to the core particle 2. Accordingly, an added value of the core particle 2 can be increased.

Since an O/Si ratio of the silicon oxide in the coating 3 influences the properties of the silicon oxide, it is desired to optimize the O/Si ratio. Specifically, the O/Si ratio of the silicon oxide in the coating 3 is preferably 2.0 or more and 4.0 or less, and more preferably 2.0 or more and 3.5 or less. When the O/Si ratio of the silicon oxide is within the above range, denseness of the coating 3 can be particularly improved. Therefore, properties such as an insulating property, heat resistance, and corrosion resistance of the coating 3 can be further improved.

The O/Si ratio of the silicon oxide refers to a ratio of the number of O atoms to the number of Si atoms. Such an O/Si ratio can be calculated based on, for example, an analysis result by X-ray photoelectron spectroscopy (XPS) for the coating 3.

A thickness of the coating 3 is not particularly limited, and is preferably 1 nm or more and 100 nm or less, more preferably 2 nm or more and 50 nm or less, and still more preferably 3 nm or more and 20 nm or less. When the thickness of the coating 3 is within the above range, it is possible to avoid an excessive thickness of the coating 3 while ensuring the above properties. That is, when the thickness of the coating 3 is smaller than the above lower limit value, the thickness of the coating 3 may be insufficient and the above properties may not be sufficiently obtained. Meanwhile, when the thickness of the coating 3 is larger than the above upper limit value, the thickness of the coating 3 is excessive, and for example, an occupancy rate of the core particle 2 in the dust core may be decreased and magnetic properties of the dust core may be decreased.

2. Method for Manufacturing Coated Metal Powder

First, a method for manufacturing a coated metal powder according to an embodiment will be described.

Figure 2:
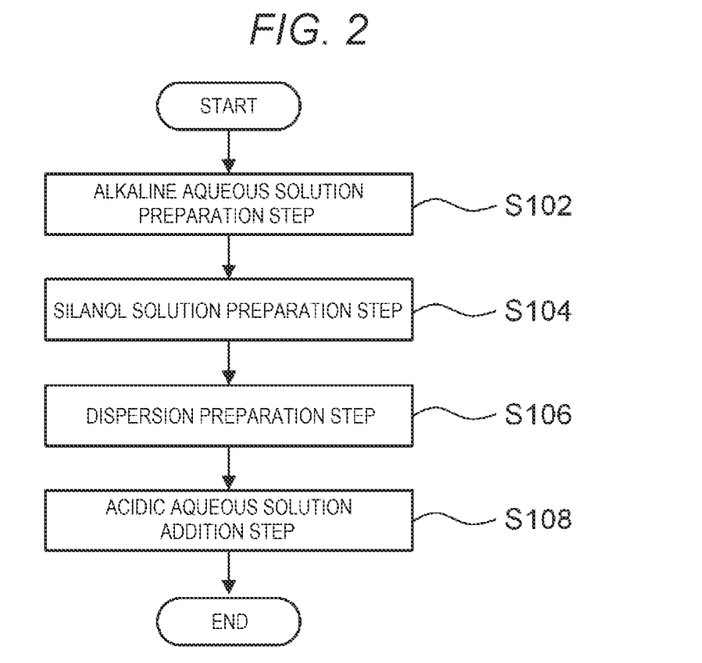
FIG. 2 is a flowchart illustrating a method for manufacturing a coated metal powder according to an embodiment.

FIG. 2 is a flowchart illustrating the method for manufacturing a coated metal powder according to the embodiment. FIG. 3 to FIG. 8 are schematic diagrams illustrating the method for manufacturing a coated metal powder according to the embodiment.

As shown in FIG. 2, the method for manufacturing a coated metal powder according to the embodiment includes an alkaline aqueous solution preparation step S102, a silanol solution preparation step S104, a dispersion preparation step S106, and an acidic aqueous solution addition step S108. Hereinafter, each step will be described in sequence.

2.1. Alkaline Aqueous Solution Preparation Step

Figure 3:
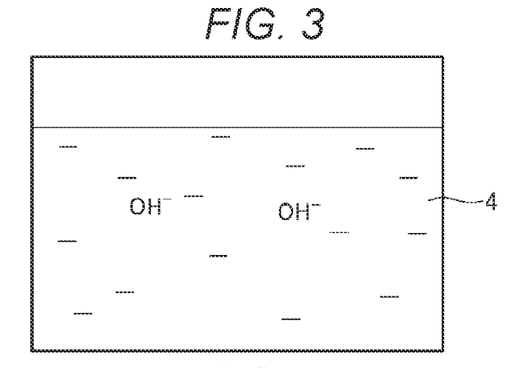
FIG. 3 is a schematic diagram illustrating the method for manufacturing a coated metal powder according to the embodiment.

In the alkaline aqueous solution preparation step S102, an alkaline aqueous solution 4 shown in FIG. 3 is prepared. The alkaline aqueous solution 4 is an aqueous solution obtained by dissolving an alkali in water.

Examples of the alkali include strong alkalis such as sodium hydroxide, potassium hydroxide, and calcium hydroxide, and weak alkalis such as ammonia, tetramethylammonium, and sodium hydrogen carbonate.

For example, when ammonia is used as the alkali, ammonia is ionized by a reaction as shown in the following Formula (1). Accordingly, an ammonium ion and a hydroxide ion are generated.

$$NH_3 + H_2O \rightarrow NH_4^+ + OH^- \tag{1}$$

The alkaline aqueous solution 4 may exhibit a strong alkalinity, but preferably exhibits a weak alkalinity. The alkaline aqueous solution 4 exhibiting a weak alkalinity can prevent an excessive increase in pH of a dispersion described later. Accordingly, when an acidic aqueous solution is added to the dispersion in the acidic aqueous solution addition step S108 described later, it is possible to avoid a sudden change in pH of the dispersion. As a result, it is possible to avoid a problem due to a sudden change in pH, for example, a problem of a decrease in denseness of the coating 3.

A pH of the alkaline aqueous solution 4 is preferably 8.0 or more, more preferably 8.0 or more and 12.0 or less, and still more preferably 8.0 or more and 11.0 or less.

The weak alkalinity means that the pH of the alkaline aqueous solution 4 is 8.0 or more and 11.0 or less, and the strong alkalinity means that the pH of the alkaline aqueous solution 4 is more than 11.0.

The pH of the alkaline aqueous solution 4 is measured by a pH measuring method by using a pH meter using a glass electrode, as defined in JIS Z 8802:2011.

The alkaline aqueous solution 4 is an aqueous solution of the above alkali, and is preferably an amine-based aqueous solution. The amine-based aqueous solution is an aqueous solution using an amine-based compound such as ammonia or tetramethylammonium as an alkali. Even when a cation generated by ionization of the alkali is incorporated into the coating 3, a decrease in properties of the coating 3 can be prevented by using the amine-based aqueous solution as the alkaline aqueous solution 4.

A commercially available product may be obtained instead of preparing the alkaline aqueous solution 4. In that case, this step is omitted. Further, any additive may be added to the alkaline aqueous solution 4.

2.2 Silanol Solution Preparation Step

Figure 4:
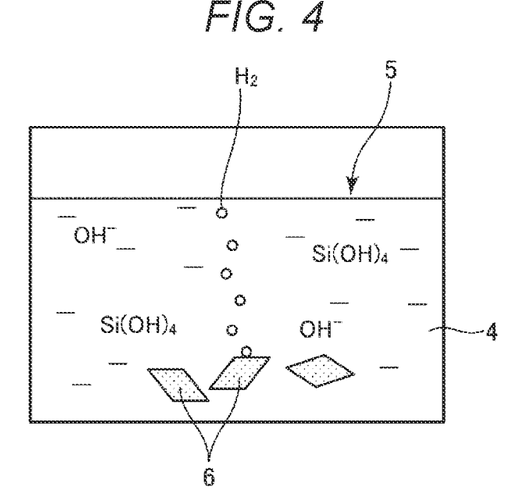
FIG. 4 is a schematic diagram illustrating the method for manufacturing a coated metal powder according to the embodiment.

In the silanol solution preparation step S104, a silanol solution 5 shown in FIG. 4 is prepared. The silanol solution 5 refers to the alkaline aqueous solution 4 containing a silanol. The silanol is a general term for silicon compounds each having a hydroxy group (OH⁻), and examples thereof include orthosilicic acid represented by $Si(OH)_4$, an oligomer thereof, and a precursor of orthosilicic acid (silicate ion). In each figure of the present application, orthosilicic acid is illustrated as an example of the silanol.

In FIG. 4, a Si chip 6 is added to the alkaline aqueous solution 4 in order to dissolve the silanol in the alkaline aqueous solution 4. The Si chip 6 is an individual piece of a Si wafer and is made of Si. Si is dissolved in the alkaline aqueous solution 4 to obtain a silanol. This reaction is represented by the following Formula (2).

$$Si+4H_2O \rightarrow Si(OH)_4+2H_2 \quad (2)$$

In the above Formula (2), examples of the silanol include orthosilicic acid. With the reaction represented by the above Formula (2), a silanol and hydrogen are produced.

The method for dissolving the silanol in the alkaline aqueous solution 4 is not limited to the method by using the Si chip 6, and may be, for example, a method by using silicon carbide, silicon nitride or the like, in addition to a silicon oxide such as quartz crystal or quartz glass. That is, a substance to be dissolved in the alkaline aqueous solution 4 may be a silicon-containing substance containing a simple substance of silicon or a silicon compound.

An amount of the Si chip 6 added to the alkaline aqueous solution 4 is not particularly limited, and is preferably 0.01 g or more and 0.50 g or less, and more preferably 0.03 g or more and 0.20 g or less with respect to 40 mL of the alkaline aqueous solution 4. Accordingly, since the amount of the Si chip 6 added to the alkaline aqueous solution 4 can be reduced, the cost of the method for manufacturing a coated metal powder can be reduced.

Figure 5:
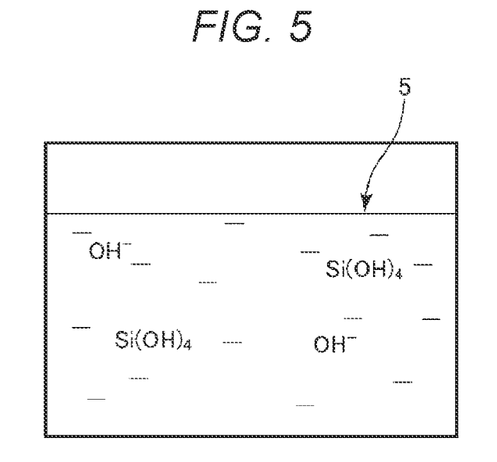
FIG. 5 is a schematic diagram illustrating the method for manufacturing a coated metal powder according to the embodiment.

The Si chip 6 remaining undissolved is removed. Accordingly, the silanol solution 5 shown in FIG. 5 is obtained.

Further, if necessary, the alkaline aqueous solution 4 and the silanol solution 5 may be heated. Accordingly, the reaction represented by the above Formula (2) is promoted. Temperatures of the alkaline aqueous solution 4 and the silanol solution 5 are preferably 30° C. or higher and 100° C. or lower, and more preferably 40° C. or higher and 90° C. or lower. By setting the temperatures of the alkaline aqueous solution 4 and the silanol solution 5 within the above range, the Si chip 6 can be efficiently dissolved and the silanol solution 5 can be prepared in a short time.

Further, a time for maintaining the temperatures is not particularly limited, and is preferably 3 hours or longer, more preferably 10 hours or longer and 120 hours or shorter, and still more preferably 20 hours or longer and 72 hours or shorter. Accordingly, a silanol concentration in the silanol solution 5 can be increased until the silanol solution 5 is in an excessively dissolved state. As a result, in the step described later, the coating 3 which is dense and has little unevenness in thickness can be efficiently formed.

In this step, a commercially available product of the silanol solution 5 may be obtained instead of preparing the silanol solution 5. Further, any additive may be added to the silanol solution 5.

Further, before the dispersion preparation step S106 described later, an operation of removing the cation generated by ionization of the alkali may be performed, if necessary. Examples of such an operation include an ion exchange treatment. An ion exchange resin is used in the ion exchange treatment.

2.3. Dispersion Preparation Step

Figure 6:
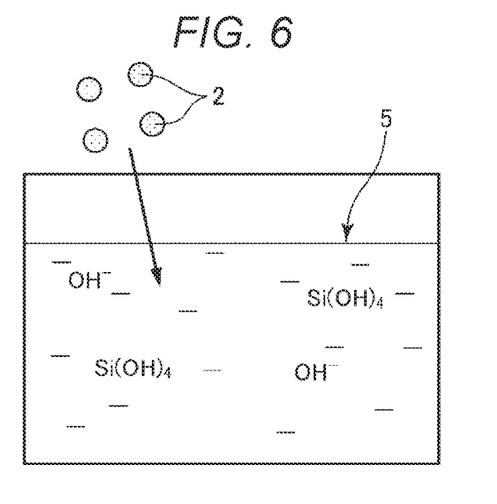
FIG. 6 is a schematic diagram illustrating the method for manufacturing a coated metal powder according to the embodiment.
Figure 7:
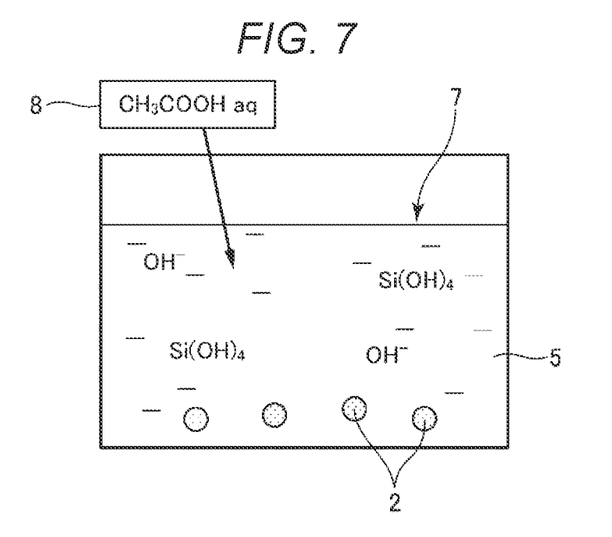
FIG. 7 is a schematic diagram illustrating the method for manufacturing a coated metal powder according to the embodiment.

In the dispersion preparation step S106, as shown in FIG. 6, the core particle 2 (metal powder) is charged into the silanol solution 5. Accordingly, as shown in FIG. 7, a dispersion 7 in which the core particle 2 is dispersed in the silanol solution 5 is obtained.

An amount of the core particle 2 added to the dispersion 7 is not particularly limited, and is preferably 0.5 g or more and 20 g or less, and more preferably 1.0 g or more and 10 g or less with respect to 40 mL of the dispersion 7. Accordingly, finally, the coating 3 having a sufficient thickness can be efficiently formed.

The method for manufacturing the core particle 2 is not particularly limited and examples thereof include various atomization methods such as a water atomization method, a gas atomization method, and a rotary water atomization method, and a pulverization method.

2.4. Acidic Aqueous Solution Addition Step

Figure 8:
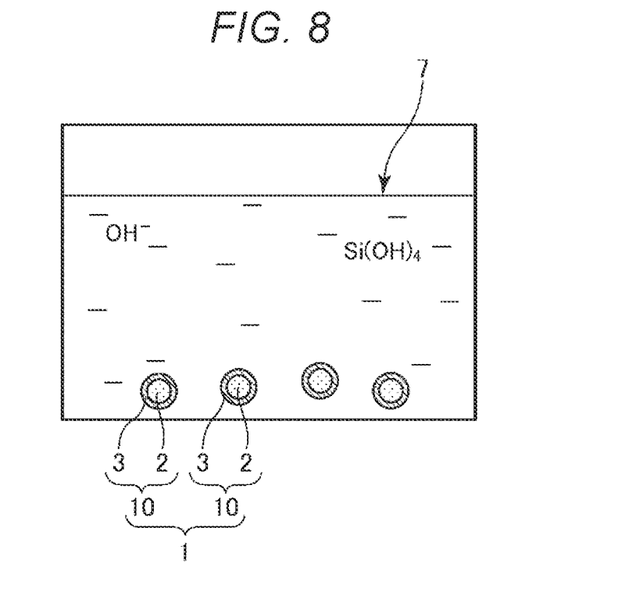
FIG. 8 is a schematic diagram illustrating the method for manufacturing a coated metal powder according to the embodiment.

In the acidic aqueous solution addition step S108, as shown in FIG. 7, an acidic aqueous solution 8 is added to the dispersion 7. Accordingly, the silanol dissolved in the dispersion 7 is aggregated on the surface of the core particle 2 with the addition of the acidic aqueous solution 8, and the concentration thereof tends to be increased. Finally, the silanol is polycondensed and gelled to a silicon oxide. Accordingly, the coating 3 containing a silicon oxide is formed on the surface of the core particle 2, and the coated metal particle 10 shown in FIG. 8 is obtained. The obtained coated metal particle 10 may be subsequently subjected to a cleaning treatment and a drying treatment.

The acidic aqueous solution 8 is an aqueous solution exhibiting an acidity. Examples of such an acidic aqueous solution 8 include a carboxylic acid aqueous solution such as an acetic acid aqueous solution, a citric acid aqueous solution, and an oxalic acid aqueous solution, a weakly acidic aqueous solution such as hypochlorous acid, and a strongly acidic aqueous solution such as hydrochloric acid and sulfuric acid. In FIG. 7, an acetic acid aqueous solution is shown as an example of the acidic aqueous solution 8.

When an acetic acid aqueous solution is used as the acidic aqueous solution 8, a silicon oxide is produced by a reaction as shown in the following Formula (3).

$$Si(OH)_4 \rightarrow SiO_2+2H_2O \quad (3)$$

In the above Formula (3), examples of the silicon oxide include $SiO_2$.

The acidic aqueous solution 8 may exhibit a strong acidity, but preferably exhibits a weak acidity. The acidic aqueous solution 8 exhibiting a weak acidity restrains a sudden change in pH of the dispersion 7 when the acidic aqueous solution 8 is added to the dispersion 7. Accordingly, it is possible to avoid a problem due to a sudden change in pH, for example, a problem of a decrease in denseness of the coating 3.

A pH of the acidic aqueous solution 8 is preferably 6.0 or less, and more preferably 3.0 or more and 5.0 or less.

The weak acidity means that the pH of the acidic aqueous solution 8 is 3.0 or more and 6.0 or less, and the strong acidity means that the pH of the acidic aqueous solution 8 is less than 3.0.

The pH of the acidic aqueous solution 8 is measured by a pH measuring method by using a pH meter using a glass electrode, as defined in JIS Z 8802:2011.

The acidic aqueous solution 8 is preferably a carboxylic acid aqueous solution. The carboxylic acid aqueous solution is an aqueous solution of an organic compound having a carboxy group. Even when an anion obtained by ionizing a carboxylic acid is incorporated into the coating 3, a decrease in properties of the coating 3 can be prevented by using the carboxylic acid aqueous solution as the acidic aqueous solution 8.

A pH of the dispersion 7 after adding the acidic aqueous solution 8 is preferably 7.0 or more and 11.0 or less, and more preferably 8.5 or more and 9.5 or less. The silicon oxide is generated on the surface of the core particle 2 at an appropriate rate by setting, within the above range, the pH of the dispersion after adding the acidic aqueous solution 8. Therefore, a particularly dense coating 3 having excellent properties is formed.

When the pH of the dispersion 7 after adding the acidic aqueous solution 8 is smaller than the above lower limit value, since the reaction represented by the above Formula (3) proceeds in a short time, the denseness of the coating 3 may be decreased. Meanwhile, when the pH of the dispersion 7 after adding the acidic aqueous solution 8 is larger than the above upper limit value, since a rate of the reaction represented by the above Formula (3) is reduced, it may take a long time to form the coating 3 or the coating 3 may be too thin.

The pH of the dispersion 7 after adding the acidic aqueous solution 8 is measured by a pH measuring method by using a pH meter using a glass electrode, as defined in JIS Z 8802:2011.

Further, the thickness of the coating 3 can be adjusted by controlling the pH of the dispersion 7 after adding the acidic aqueous solution 8. For example, the thickness of the coating 3 can be increased by lowering, within the above range, the pH of the dispersion 7 after adding the acidic aqueous solution 8.

In addition, a pH of the dispersion 7 before adding the acidic aqueous solution 8 is higher than the pH of the dispersion 7 after adding the acidic aqueous solution 8 by preferably 0.5 or more and 4.0 or less, and more preferably 1.0 or more and 3.0 or less. Accordingly, a change in pH before and after adding the acidic aqueous solution 8 can be relatively moderated. As a result, it is possible to prevent the rate of the reaction represented by the above Formula (3) from being too fast or too slow, and it is possible to form a dense coating 3 at a sufficient rate. Therefore, it is possible to efficiently manufacture the coated metal particle 10 including the coating 3 having excellent properties.

As described above, the method for manufacturing the coated metal powder 1 according to the present embodiment includes the silanol solution preparation step S104, the dispersion preparation step S106, and the acidic aqueous solution addition step S108. In the silanol solution preparation step S104, the silanol solution 5 in which a silicon-containing substance is dissolved in the alkaline aqueous solution 4 is prepared. In the dispersion preparation step S106, the core particle 2 which is a metal powder is charged into the silanol solution 5 to obtain the dispersion 7. In the acidic aqueous solution addition step S108, the coating 3 containing the silicon oxide is formed on the surface of the core particle 2 by adding the acidic aqueous solution 8 to the dispersion 7.

According to such a configuration, the coating 3 having a high insulating property and high heat resistance can be inexpensively and efficiently formed on the surface of the core particle 2. That is, in the present embodiment, since the alkaline aqueous solution 4 and the acidic aqueous solution 8 are mainly used without using an organic solvent, a procurement cost of the organic solvent and a wastewater treatment cost are not required, and thus, a cost required for forming the coating 3 can be reduced. In addition, since the coating 3 is dense and a content of an organic component derived from a raw material is low, the insulating property and heat resistance thereof are excellent.

Further, a process of producing the silicon oxide by using the acidic aqueous solution 8 has a feature that a production rate of the silicon oxide is high since a reaction promoting action associated with the addition of the acidic aqueous solution is very remarkable. Therefore, in the present embodiment, despite of a low cost, the coating 3 can be efficiently formed.

Further, a method of using a silicon oxide precursor as a raw material has been known in the related art, but the silicon oxide precursor also requires a procurement cost. In the present embodiment, since the Si chip 6 which is easily available can be used, a manufacturing cost can be reduced from the viewpoint of a procurement cost of a raw material.

A temperature of the dispersion 7 when the acidic aqueous solution 8 is added is preferably 30° C. or higher and 100° C. or lower, and more preferably 40° C. or higher and 90° C. or lower. The reaction represented by the above Formula (3) is promoted by setting the temperature of the dispersion 7 within the above range. Therefore, the coating 3 can be formed in a shorter time. Further, if the formation time is the same, the coating 3 can be made thicker.

Further, a time for maintaining the temperature is not particularly limited, and is preferably 3 hours or longer, more preferably 10 hours or shorter and 240 hours or less, and still more preferably 20 hours or longer and 120 hours or shorter. Accordingly, a coating 3 having a dense, necessary and sufficient thickness can be evenly formed.

The coated metal powder 1 obtained as described above is used for manufacturing the above-mentioned dust core, and is also used for any purpose. Examples of applications of the coated metal powder 1 include a powder for a 3D printer and a powder for powder metallurgy.

An average particle size of the coated metal powder 1 is not particularly limited, and is preferably 1.0 μm or more and 30.0 μm or less, and more preferably 2.0 μm or more and 10.0 μm or less. Accordingly, when, for example, a dust core is manufactured by using the coated metal powder 1, an eddy current loss in particles in the dust core can be reduced. Further, since a green density can be increased, the magnetic properties of the dust core can be easily improved.

The average particle size of the coated metal powder 1 is determined as a particle size D50 when a cumulative particle size counted from a smaller diameter side is 50% in volume-based particle size distribution obtained by a laser diffraction method.

Although the method for manufacturing a coated metal powder according to an aspect of the present disclosure has been described above based on the illustrated embodiment, the present disclosure is not limited thereto, and for example, the method for manufacturing a coated metal powder according to an aspect of the present disclosure may be obtained by adding a step for any purpose to the embodiment.

EXAMPLES

Next, specific examples according to an aspect of the present disclosure will be described.

3. Manufacturing of Coated Metal Powder

3.1. Example 1

First, an alkaline aqueous solution was prepared. A sodium hydroxide aqueous solution was used as the alkaline aqueous solution. The pH of the alkaline aqueous solution was 12.0.

Next, a Si chip was added to the obtained alkaline aqueous solution. Then, the temperature of the alkaline aqueous solution was maintained at 50° C. for 1 day (24 hours). Thereafter, the remaining Si chip was removed from the alkaline aqueous solution to obtain a silanol solution.

Then, a metal powder was charged into the obtained silanol solution to prepare a dispersion. A Fe—Si—B-based amorphous alloy powder having an average particle size of 5.0 μm produced by a water atomization method was used as the metal powder.

Then, an acidic aqueous solution was added to the obtained dispersion. An acetic acid aqueous solution was used as the acidic aqueous solution. The pH of the acidic aqueous solution was 4.0. After adding the acidic aqueous solution, the temperature of the dispersion was maintained at 50° C. for 1 day (24 hours). The pH of the dispersion before adding the acidic aqueous solution was 12.0, and the pH of the dispersion after adding the acidic aqueous solution was 7.5. Accordingly, a coating containing a silicon oxide was formed on a particle surface of the metal powder.

Thereafter, the obtained coated metal powder was taken out from the dispersion and dried by vacuum drying. The above manufacturing conditions are shown in Table 1. In Table 1, the pH of the dispersion after adding the acidic aqueous solution was defined as "pH of dispersion". Further, in Table 1, a difference between the pH of the dispersion before adding the acidic aqueous solution and the pH of the dispersion after adding the acidic aqueous solution was defined as "pH difference".

3.2. Example 2

First, an alkaline aqueous solution was prepared. Ammonia water was used as the alkaline aqueous solution. The pH of the alkaline aqueous solution was 10.5.

Next, a Si chip was added to the obtained alkaline aqueous solution. Then, the temperature of the alkaline aqueous solution was maintained at 50° C. for 1 day (24 hours). Thereafter, the remaining Si chip was removed from the alkaline aqueous solution to obtain a silanol solution.

Then, a metal powder was charged into the obtained silanol solution to prepare a dispersion. A Fe—Si—B-based amorphous alloy powder having an average particle size of 5.0 μm produced by a water atomization method was used as the metal powder.

Then, an acidic aqueous solution was added to the obtained dispersion. An acetic acid aqueous solution was used as the acidic aqueous solution. The pH of the acidic aqueous solution was 4.0. After adding the acidic aqueous solution, the temperature of the dispersion was maintained at 50° C. for 1 day (24 hours). The pH of the dispersion before adding the acidic aqueous solution was 10.5, and the pH of the dispersion after adding the acidic aqueous solution was 8.0. Accordingly, a coating containing a silicon oxide was formed on a particle surface of the metal powder.

Thereafter, the obtained coated metal powder was taken out from the dispersion and dried by vacuum drying. The above manufacturing conditions are shown in Table 1. In Table 1, the pH of the dispersion after adding the acidic aqueous solution was defined as "pH of dispersion". Further, in Table 1, a difference between the pH of the dispersion before adding the acidic aqueous solution and the pH of the dispersion after adding the acidic aqueous solution was defined as "pH difference".

3.3 Examples 3 to 5

Coated metal powders were obtained in the same manner as in Example 1 except that manufacturing conditions were changed as shown in Table 1.

3.4. Comparative Example

First, a metal powder, tetraethoxysilane, isopropyl alcohol (organic solvent), ammonia water, and water were mixed to prepare a hydrolyzed solution. The obtained hydrolyzed solution was stirred by using a propeller stirrer for 3 hours.

Thereafter, the metal powder was subjected to a heat treatment at 120° C. for 1 hour after the metal powder and the hydrolyzed solution were separated from each other. Accordingly, a coated metal powder was obtained.

4. Evaluation of Coated Metal Powders

4.1. Dielectric Breakdown Voltage

For each of the coated metal powders in Examples and Comparative Example, a dielectric breakdown voltage at room temperature (25° C.) was measured by the following method.

Next, the coated metal powder was subjected to a heat treatment at 150° C. for 700 hours. Thereafter, for the coated metal powder after the heat treatment, the dielectric breakdown voltage was measured again by the following method.

The method for measuring the dielectric breakdown voltage is as follows.

First, an alumina cylinder having an inner diameter of 8 mm was filled with 2 g of the coated metal powder, and brass electrodes were disposed at both ends of the cylinder. Thereafter, a voltage of 50 V was applied between the electrodes for 2 seconds while a pressure of 40 kg/cm² was applied between the electrodes at both ends of the cylinder by using a digital force gauge.

Next, the voltage applied between the electrodes was boosted to 100 V and maintained for 2 seconds, and electrical resistance between the electrodes at this time was measured by using a digital multimeter to confirm the presence or absence of dielectric breakdown.

Thereafter, the voltage applied between the electrodes was boosted by 50 V from 150 V, and the electrical resistance between the electrodes was measured by using a digital multimeter each time to confirm the presence or absence of the dielectric breakdown. Next, the boost by 50 V in voltage and the measurement for the electrical resistance were performed until the dielectric breakdown occurred, and the lowest voltage value at which the dielectric breakdown occurred was defined as the dielectric breakdown voltage.

For the dielectric breakdown voltage measured in this way, the presence or absence of a change before and after the heat treatment was evaluated in light of the following evaluation criteria.

A: the dielectric breakdown voltage did not change before and after the heat treatment.
B: the dielectric breakdown voltage after the heat treatment was slightly lower than that before the heat treatment (a change range was less than 100 V).
C: the dielectric breakdown voltage after the heat treatment was significantly lower than that before the heat treatment (the change range was 100 V or more).

Evaluation results are shown in Table 1.

Figure 9:
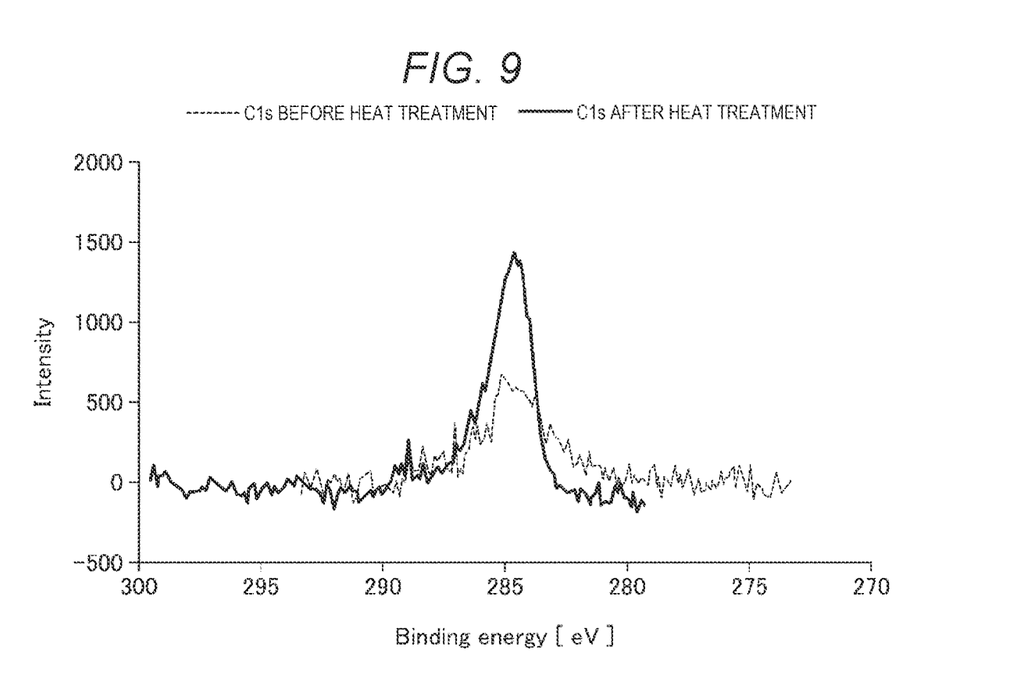
FIG. 9 is a C1s spectrum obtained by XPS for a coated metal powder before a heat treatment and a coated metal powder after the heat treatment.

X-ray source: AlKα ray
Irradiation area: diameter 100 μm
Irradiation angle: 45°
Radiation source voltage: 15 kV
Radiation source power: 25 W A C1s spectrum was obtained by the XPS for each of the coated metal powder before the heat treatment and the coated metal powder after the heat treatment described in 4.1. by the XPS set under such measurement conditions. The obtained C1s spectrum is shown in FIG. 9. A horizontal axis of FIG. 9 represents binding energy whose unit is eV, and a vertical axis thereof represents photoelectron intensity in any unit.

In the C1s spectrum shown in FIG. 9, a peak-like shape is recognized at a position corresponding to the C1s binding energy, which can be presumed to be derived from stain

TABLE 1

| | Manufacturing conditions for coated metal powder | | | | | | Evaluation results for coated metal powder Change in dielectric breakdown voltage |
|---|---|---|---|---|---|---|---|
| | Alkaline aqueous solution | | Acidic aqueous solution | | Dispersion | | before and |
| | Composition | pH | Composition | pH | pH | pH difference | after heat treatment |
| Example 1 | Sodium hydroxide aqueous solution (strong alkalinity) | 12.0 | Acetic acid aqueous solution (weak acidity) | 4.0 | 7.5 | 4.5 | B |
| Example 2 | Ammonia water (weak alkalinity) | 10.5 | Acetic acid aqueous solution (weak acidity) | 4.0 | 8.0 | 2.5 | A |
| Example 3 | Sodium hydrogen carbonate aqueous solution (weak alkalinity) | 9.0 | Citric acid aqueous solution (weak acidity) | 4.0 | 8.0 | 1.0 | A |
| Example 4 | Sodium hydroxide aqueous solution (strong alkalinity) | 12.0 | Citric acid aqueous solution (weak acidity) | 4.0 | 8.0 | 4.0 | A |
| Example 5 | Sodium hydroxide aqueous solution (strong alkalinity) | 12.0 | Hydrochloric acid (strong acidity) | 2.0 | 7.0 | 5.0 | B |
| Comparative Example | Mixture of metal powder, tetraethoxysilane, isopropyl alcohol, ammonia water, and water | | | | | | C |

As shown in Table 1, in each of the coated metal powders in Examples, no significant change in dielectric breakdown voltage is recognized before and after the heat treatment. In particular, it is recognized that by optimizing a change range of pH before and after adding the acidic aqueous solution, the change range of the dielectric breakdown voltage can be kept small even after the heat treatment. Therefore, it is recognized that each of the coated metal powders in Examples includes a coating having a high insulating property and high heat resistance.

4.2. Evaluation of Content of Auxiliary Component Derived from Raw Material

The coated metal powder in Example 2 was subjected to surface analysis by X-ray photoelectron spectroscopy (XPS). In the XPS, the composition of the coating can be analyzed and a bonding state of atoms can be specified based on a chemical shift. Measurement conditions of the XPS are as shown below.

attached to an analyte for the following reasons. The stain is usually considered to be an organic substance containing a C—H bond. Since the binding energy of the C—H bond is substantially 284.8 eV, the peak-like shape shown in FIG. 9 is presumed to be due to the C—H bond derived from the stain. The peak-like shape is recognized in the C1s spectrum obtained in both the coated metal powder before the heat treatment and the coated metal powder after the heat treatment.

Meanwhile, examples of the auxiliary component derived from the raw material include a substance containing a C—O bond derived from an acetic acid aqueous solution which is an acidic aqueous solution. Since the binding energy of the C—O bond is substantially 286.5 eV, it can be said that the C—O bond derived from the raw material is not recognized in the C1s spectrum shown in FIG. 9.

Figure 10:
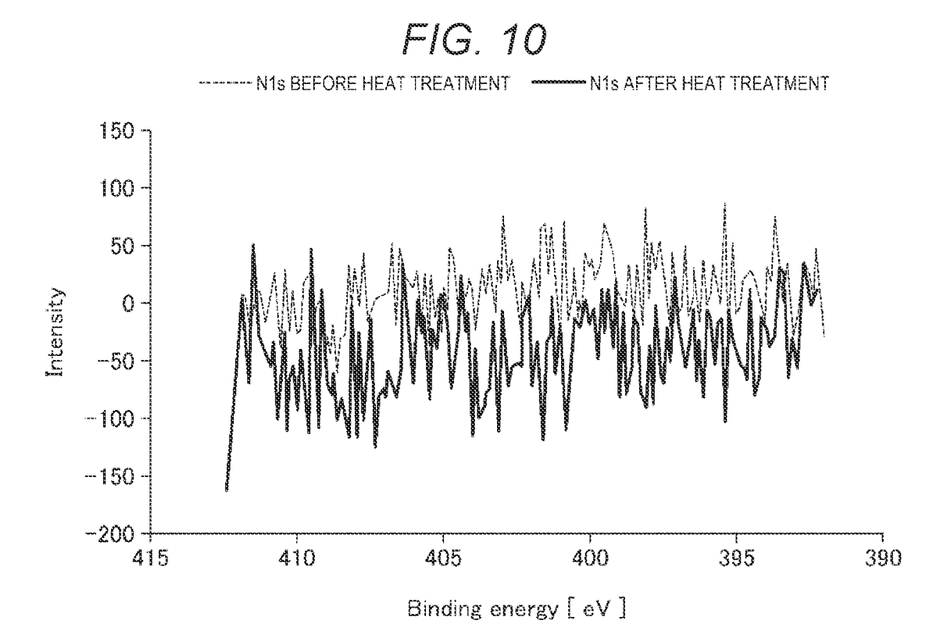
FIG. 10 is an N1s spectrum obtained by XPS for the coated metal powder before the heat treatment and the coated metal powder after the heat treatment.

Next, an N1s spectrum was obtained by the XPS for each of the coated metal powder before the heat treatment and the coated metal powder after the heat treatment. The obtained N1s spectrum is shown in FIG. 10. A horizontal axis of FIG. 10 represents binding energy whose unit is eV, and a vertical axis thereof represents photoelectron intensity in any unit.

In the N1s spectrum shown in FIG. 10, no peak can be recognized at a position corresponding to an N1s binding energy.

Examples of the auxiliary component derived from the raw material include a substance containing an N—H bond derived from ammonia water which is an alkaline aqueous solution. Since the binding energy of the N—H bond is substantially 402 eV, it can be said that the N—H bond derived from the raw material is not recognized in the N1s spectrum shown in FIG. 10.

Therefore, it is considered that each of the coated metal powder in Examples contains almost no auxiliary component derived from the raw material. Thus, it can be said that the coated metal powder exhibits a good insulating property even after a heat treatment.

What is claimed is:

1. A method for manufacturing a coated metal powder, comprising:
    preparing a silanol solution in which a silicon-containing substance is dissolved in an alkaline aqueous solution;
    charging a metal powder into the silanol solution to obtain a dispersion; and
    forming a coating containing a silicon oxide on a particle surface of the metal powder by adding an acidic aqueous solution to the dispersion,
        wherein a pH of the dispersion before adding the acidic aqueous solution is higher than the pH of the dispersion after adding the acidic aqueous solution by 0.5 or more and 4.0 or less.

2. The method for manufacturing the coated metal powder according to claim 1, wherein the pH of the dispersion after adding the acidic aqueous solution is 7.0 or more and 11.0 or less.

3. The method for manufacturing the coated metal powder according to claim 1, wherein the alkaline aqueous solution exhibits a weak alkalinity.

4. The method for manufacturing the coated metal powder according to claim 3, wherein the alkaline aqueous solution is an amine-based aqueous solution.

5. The method for manufacturing the coated metal powder according to claim 1, wherein the acidic aqueous solution exhibits a weak acidity.

6. The method for manufacturing the coated metal powder according to claim 5, wherein the acidic aqueous solution is a carboxylic acid aqueous solution.

7. The method for manufacturing the coated metal powder according to claim 1, wherein a temperature of the dispersion when the acidic aqueous solution is added is 30° C. or higher and 100° C. or lower.

8. The method for manufacturing the coated metal powder according to claim 1, wherein an O/Si ratio of the silicon oxide in the coating is 2.0 or more and 4.0 or less.

9. The method for manufacturing the coated metal powder according to claim 1, wherein a thickness of the coating is 1 nm or more and 100 nm or less.

* * * * *